United States Patent
Morchel et al.

(10) Patent No.: US 6,529,155 B2
(45) Date of Patent: Mar. 4, 2003

(54) TRANSPONDER APPARATUS

(75) Inventors: Herman G. Morchel, Nutley, NJ (US); Angelo R. Tedesco, Marlboro, NJ (US); Charles M. Curtis, Rockaway, NJ (US)

(73) Assignee: ITT Defense and Electronics, McLean, VA (US)

( * ) Notice: Subject to any disclaimer, the term of this patent is extended or adjusted under 35 U.S.C. 154(b) by 0 days.

(21) Appl. No.: 09/875,254

(22) Filed: Jun. 7, 2001

(65) Prior Publication Data

US 2002/0186160 A1 Dec. 12, 2002

(51) Int. Cl.$^7$ ............................................. G01S 13/76
(52) U.S. Cl. ........................... 342/51; 342/44; 342/83
(58) Field of Search .............................. 342/40, 42, 44, 342/51, 73, 82, 83

(56) References Cited

U.S. PATENT DOCUMENTS

| | | | |
|---|---|---|---|
| 3,803,607 A | | 4/1974 | Robinson ................ 342/172 |
| 4,040,054 A | | 8/1977 | Overman ................ 342/13 |
| 4,144,534 A | * | 3/1979 | Prickett et al. ........... 342/43 |
| 4,517,568 A | | 5/1985 | Willmore ................. 342/14 |
| 5,506,584 A | * | 4/1996 | Boles .................... 342/42 |
| 5,508,705 A | * | 4/1996 | Spiess ................... 342/44 |
| 5,614,912 A | * | 3/1997 | Mitchell ................ 342/146 |

OTHER PUBLICATIONS

"Applied ECM", Van Brunt, ISBN 0–931728–00–2, pp. 346–348, 1978.

* cited by examiner

Primary Examiner—John B. Sotomayor
(74) Attorney, Agent, or Firm—McDermott, Will & Emery

(57) ABSTRACT

A method and apparatus for transponding pulsed RF signals is provided. The method comprises receiving, with a receiver, pulsed RF signals having a plurality of PRIs. Further the method includes generating, with a PRI tracker, control signals from the received pulsed RF signals. The method then filters the received pulsed RF signals with the control signals to thereby obtain enable signals, which in turn control a transmitter permitting retransmission without clock jitter.

30 Claims, 3 Drawing Sheets

TRANSPONDER APPARATUS

I. FIELD OF INVENTION

The present invention relates generally to a transponder apparatus for receiving and re-transmitting pulsed RF signals, and more specifically, a tunable transponder apparatus that provides for the retransmission of a received signal, while minimizing interference and/or clock jitter associated with prior art transponders.

II. BACKGROUND OF THE INVENTION

Radar identification systems have been known for many years, having originated during the Second World War. In such systems, an interrogation apparatus sends out a radio frequency pulse, which is recognized by an identification apparatus fitted to a vehicle or other object within range of the interrogation apparatus.

Upon receipt of the pulse, a repeater sends back a reply signal, generally in the form of a train of pulses, which is processed and displayed at a receiving station. Such systems, which require the provision of a responder on the vehicle or other object, are known as secondary radars, or repeaters, as distinct from primary radars which work by passive reflection of radio waves by targets. Normally, a repeater operates in conjunction with a primary radar so that the responses received from repeaters on radar targets can be correlated/identified from the echoes received by the primary radar from the targets themselves. FIG. 5 illustrates an exemplary prior art repeater system. The repeater system of FIG. 5 includes a receiver 504 for receiving the radar pulse, a filter 502 for filtering out noise, and an amplifier 506 for amplifying the signal and for re-transmitting the signal (repeating).

As radar systems become more sophisticated, and more sensitive, repeater systems have also become more complex. However, these complex repeater systems are prone to interference, stemming, in part, from feedback of the retransmitted signal generated by the repeater. Further, these repeater systems lack the ability to provide adequate isolation between input and output to provide sufficient power at low input signal levels.

Transponders overcome the foregoing power problem associated with simple repeater systems. FIG. 6 illustrates an exemplary prior art transponder system. As illustrated in FIG. 6, the transponder includes an input antenna 601, a receiver 604 for receiving the radar pulse, a filter 602 for filtering out noise, a second signal source generator 606 for generating a new carrier signal, logic circuitry 608 for re-clocking the received signal to the new carrier signal, and an amplifier 610 for amplifying the filtered signal, and an output antenna 609 for retransmitting the signal (transponding). In a transponder, the received signal is detected and is re-clocked with the new carrier signal prior to amplification and transmission.

Radar related systems have been further used to detect signals from uncooperative sources or emitters and to track such signals. Typically, these systems utilize pulse-repetition-interval (PRI) trackers. As explained in detail below, a PRI tracker is an apparatus that synchronizes with a received pulse train associated with a given signal and a generates an output signal corresponding to the expected PRI of the incoming signal.

Notwithstanding the foregoing use of repeater and transponder systems, as stated such prior art systems are prone to interference and lack the ability to provide adequate isolation between input and output to produce sufficient power at low input signal levels. Furthermore, prior art radar transponders add unacceptable clock jitter to the retransmitted signal for certain applications. Still further, the retransmitted signal from the transponder is additionally subject to interference resulting from the feedback.

III. SUMMARY OF THE INVENTION

It is an object of this invention to provide a transponder that corrects the foregoing deficiencies in the prior art systems.

More specifically, it is an object of the present invention to provide a transponder that minimizes its vulnerability to interference.

It is another object of this invention to provide a transponder that is able to provide sufficient power at low input levels.

It is an object of the present invention to eliminate clock-jitter from a re-transmitted signal. In other words, the present invention allows for an accurate and consistent reproduction of the leading edge of the return signal, thereby allowing for the elimination of interference caused by random and/or improperly generated return signals.

The present invention provides a method of transponding pulsed RF signals comprising the steps of receiving pulsed RF signals having a plurality of PRIs, generating, with a PRI tracker, control signals from the received pulsed RF signals, filtering the received pulsed RF signals with the control signals to thereby obtain enable signals, and controlling a transmitter with the enable signals.

In one embodiment of the present invention the step of controlling a transmitter further includes the step of enabling an amplifier, the amplifier receiving an input signal from an input signal generator, and the amplifier outputting an amplified version of the input signal in accordance with the enable signals. Particularly, the amplifier is an RF amplifier and the input signal generator is a tunable RF source. More particularly, the RF amplifier is a traveling wave tube amplifier and the tunable RF source is a synthesizer.

In another embodiment of the present invention the step of filtering the received pulsed RF signals with the control signals to thereby obtain enable signals further includes, inputting the received pulsed RF signals from the receiver into one input of a logic AND gate, and inputting the control signals from the PRI tracker into the other input of a logic AND gate.

The present invention further provides a method of transponding pulsed RF signals comprising the steps of, receiving a plurality of pulsed RF signals, each pulsed RF signal having a plurality of PRIs, selecting, with a PRI tracker, one pulsed RF signal out of the plurality of pulsed RF signals, generating, with a PRI tracker, a control signal from the selected pulsed RF signal, filtering the selected pulsed RF signal with the control signal to thereby obtain an enable signal, and controlling a transmitter with the enable signal.

The present invention still further provides a pulsed RF signal transponder comprising a receiver for receiving pulsed RF signals having a plurality of PRIs, a PRI tracker for generating control signals from the received pulsed RF signals, an enable signal generator for receiving the received pulsed RF signals and the control signals as input, and for generating enable signals as output, and a transmitter, controlled with the enable signals, for transmitting.

In one embodiment of the present invention the transmitter further includes, an amplifier; and an input signal generator, wherein the amplifier, after receiving an input signal from the input signal generator, outputs an amplified version of the input signal in accordance with the enable signals. Particularly, the amplifier is an RF amplifier and the input signal generator is a tunable RF source. More particularly, the RF amplifier is a traveling wave tube amplifier and the tunable RF source is a synthesizer.

In another embodiment of the present invention, the enable signal generator further includes a logic AND gate.

The present invention still yet further provides a pulsed RF signal transponder comprising a receiver for receiving a plurality of pulsed RF signals, each pulsed RF signal having a plurality of PRIs, a PRI tracker for selecting one pulsed RF signal out of the plurality of pulsed RF signals, and for generating a control signal from the selected pulsed RF signal, a filter for filtering the selected pulsed RF signal with the control signal to thereby obtain an enable signal, and a transmitter.

In one embodiment of the present invention, the transmitter further comprises an amplifier, the amplifier receiving an input signal from an input signal generator, and the amplifier outputting an amplified version of the input signal in accordance with the enable signal. Particularly, the amplifier is an RF amplifier and the input signal generator is a tunable RF source. More particularly, the RF amplifier is a traveling wave tube amplifier and the tunable RF source is a synthesizer.

In one embodiment of the present invention, the filter further includes a logic AND gate.

The transponder of the present invention provides important advantages over the prior art devices. Most importantly, it allows for the accurate and consistent reproduction of the leading edge of the return signal, thereby allowing for the elimination of interference caused by random and/or improperly generated return signals that can be improperly construed by the radar system as the return pulse of the transponder.

Additional advantages of the present invention will become apparent to those skilled in the art from the following detailed description of exemplary embodiments of the present invention. The invention itself, together with further objects and advantages, can be better understood by reference to the following detailed description and the accompanying drawings.

IV. BRIEF DESCRIPTIONS OF THE DRAWINGS

The accompanying drawings, which are incorporated herein and form a part of the specification, illustrate embodiments of the present invention and, together with the description, serve to explain the principles of the invention. In the drawings.

V. DETAILED DESCRIPTION OF THE INVENTION

In the following description, for the purposes of explanation, numerous specific details are set forth in order to provide a more thorough understanding of the present invention. It will be apparent, however, to one skilled in the art, that variations of the embodiments disclosed herein are also possible.

Figure 1:
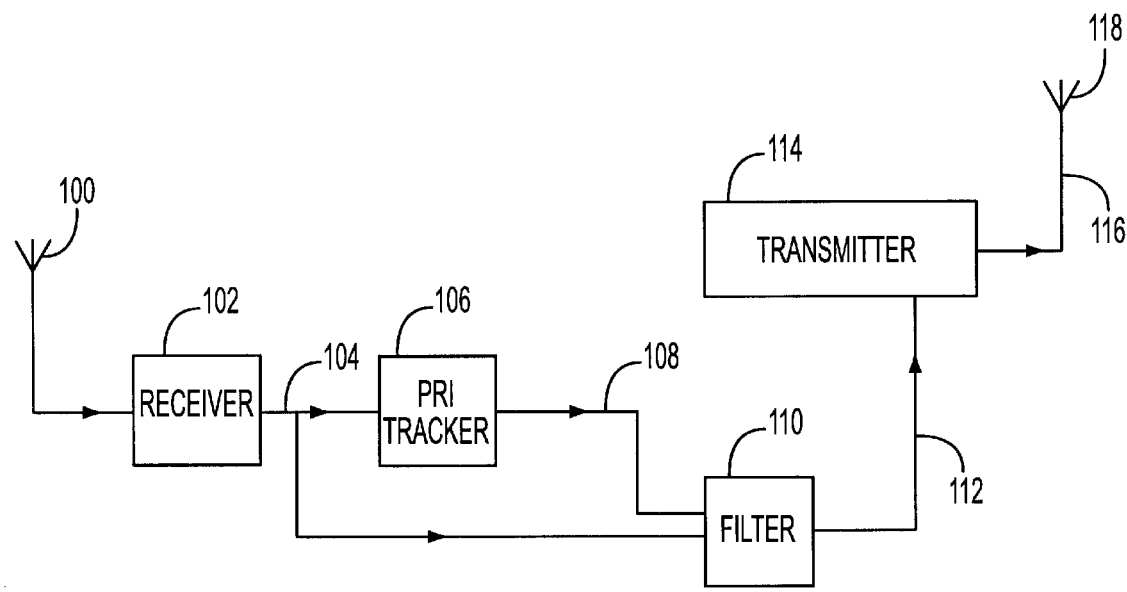
FIG. 1 depicts an exemplary embodiment of a transponder in accordance with the present invention.
Figure 2:
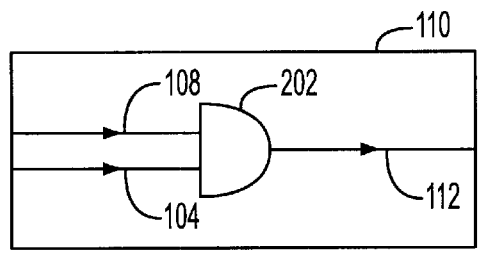
FIG. 2 depicts a logic AND gate filter used in an exemplary embodiment of a transponder in accordance with the present invention.

FIG. 1 depicts an exemplary embodiment of a triggered transponder in accordance with the present invention. As illustrated in FIG. 1, pulsed RF signals received by receiving antenna 100, are sent to receiver 102. Although receiver 102 may be a dedicated receiver, designed to receive a specific frequency or specifically modulated signal, in accordance with the present invention, receiver 102 may be a tunable receiver, designed to controllably receive a plurality of frequencies or types of modulated signals. The received signal 104 that is output from receiver 102 is sent to both a PRI tracker 106 and a filter 110. In one embodiment, the receiver 102 functions to demodulate the incoming signal so as to remove the RF carrier portion of the signal transmitted by the radar system and output a pulsed signal, which corresponds to the modulation signal utilized by the radar system. Of course, it is noted that it is also possible for the receiver 102 to output a digital signal.

The PRI tracker 106 functions to provide a gating signal having a PRI corresponding to the PRI of the expected signal to be received by the transponder. More specifically, the PRI tracker 106 is programmably commanded to establish predictive pulses which encompass (i.e., gate) the expected times of arrival of the pulses of interest (i.e., the pulses from the radar system to which the transponder is attempting to response). It is noted that PRI trackers are well known in the art (e.g., see, APPLIED ECM, Van Brunt, ISBN 0-931728-00-2, pp. 346–348). The operation of the PRI tracker 106 can be described as time domain filtering as opposed to frequency domain filtering, which can be accomplished, for example, by placing a tunable RF filter in front of the receiver. It is noted that RF filtering can be utilized in addition to time domain filtering.

During operation, the PRI tracker 106 functions to generate a pulsed signal having a pulse repetition interval (i.e., frequency), which corresponds to the expected pulse repetition interval of the incoming signal from the radar system. The PRI tracker 106, which is preprogrammed to operate at the expected pulse repetition interval, repeatedly generates a pulse having a leading edge which is designed to slightly precede the leading edge of the expected receive pulse from the radar system. In other words, the PRI tracker 106 functions to gate the expected incoming pulses transmitted by the radar system. As explained in further detail below, by utilizing the gating signal output by the PRI tracker 106 in combination with the filter 110, the present invention eliminates interference generated by extraneous signals in the incoming signal. It is noted that the precise amount the pulse precedes the leading edge of the expected receive pulse is determined on an application by application basis. It is further noted that the PRI tracker 106 is variable/tunable so as to allow for operation at different pulse repetition intervals.

The output signal 108 of the PRI tracker 106, which is a pulsed signal having substantially the same pulse repetition interval as the expected incoming signal, is coupled to an input of filter 110. The other input of the filter 110 receives the pulsed output signal generated by the receiver 102. The filter 110 uses the output signal 108 of the PRI tracker 106 to gate the received signal 104 output by the receiver 102. In other words, the filter 110 will only produce an output signal when both a pulse from the PRI tracker 106 and a pulse of the received signal 104 are present at the input of the filter 110. Accordingly, the PRI tracker 106 effectively functions as a filter preventing erroneous signals, such as signals, generated by a radar system other than the radar system the transponder intended to respond to, from causing the transponder to generate an erroneous return signal. The PRI tracker 106 in combination with the filter 110 allows use of the actual received pulse leading edge to gate the transmitter 114. This preserves the fidelity of the time of arrival of the pulse.

More specifically, as the PRI tracker 106 locks onto the incoming signal from the radar system and only allows for the generation of a return pulse within a narrow predetermined time period corresponding to the expected pulse repetition interval of the incoming signal, erroneous signals (i.e., signals not having the expected pulse repetition interval) or signals generated from sources other than the radar system will not likely fall with the gate defined by the pulsed output of the PRI tracker 106, and therefore will not cause the transponder of the present invention to generate a return pulse. As is known, it is desirable for the transponder to generate a return pulse only when it receives an incoming pulse from the radar system attempting to interrogate the transponder. Thus, the PRI tracker 106 functions to filter out signals not generated by the associated radar system, thereby reducing the possibility of interference (i.e., the generation of erroneous return signals).

In addition, the PRI tracker 106 in combination with the filter 110 functions to eliminate errors or noise associated with interfering signals. More specifically, by performing an AND operation on the output of the PRI tracker 106 and the actual input pulse, and generating an output pulse only when both signals are present, the circuit of the present invention further eliminates jitter and noise. As stated, in the given embodiment, filter 110 comprises an AND gate, which receives the output of the PRI tracker 106 and the incoming pulses 104 as input signals. Accordingly, only when the actual incoming signal is received within the expected period defined by the PRI tracker will an output signal be generated by the filter 110, which is utilized by the transmitter to generate the return signal. Thus, any variation of the time of arrival of the incoming signal is automatically accounted for by the combination of the PRI tracker 106 and the filter 110, as the filter 110 will not produce any output signal unless the actual received signal is present and within the expected time interval (i.e., gate provided by the PRI tracker 106).

As a result, the present invention produces a return pulse, wherein the leading edge of the return pulse is consistently and accurately reproduced on a pulse-by-pulse basis relative to the leading edge of the incoming pulse. In other words, the time difference between the leading edge of the received pulse and the leading edge of the return exhibits a constant delay time, having a very small deviation (i.e., jitter), and the consistency of the delay is maintained on a pulse-by-pulse basis.

Figure 3:
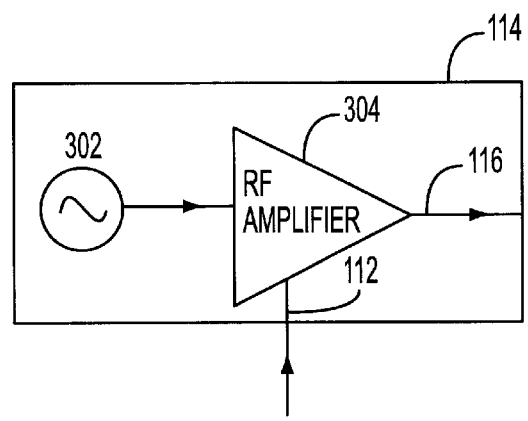
FIG. 3 depicts an exemplary embodiment of a transmitter used in an exemplary embodiment of a transponder in accordance with the present invention.

As stated, an enable signal 112, which is output by the filter 110, enables (i.e., triggers) the transmitter 114 to transmit a return signal 116 via transmitting antenna 118. FIG. 3 illustrates an exemplary embodiment of a transmitter 114. As illustrated in FIG. 3, the transmitter 114 may include a tunable RF source 302 that supplies an input signal to an RF amplifier 304. A non-limiting example of a tunable RF source 302 includes a synthesizer, whereas a non-limiting example of an RF amplifier 304 includes a travelling wave tube amplifier. The transmitted signal 116 is sent to the transmitting antenna 118, which may comprise any known antenna type, including beam forming antenna such as phased array antenna.

Figure 4:
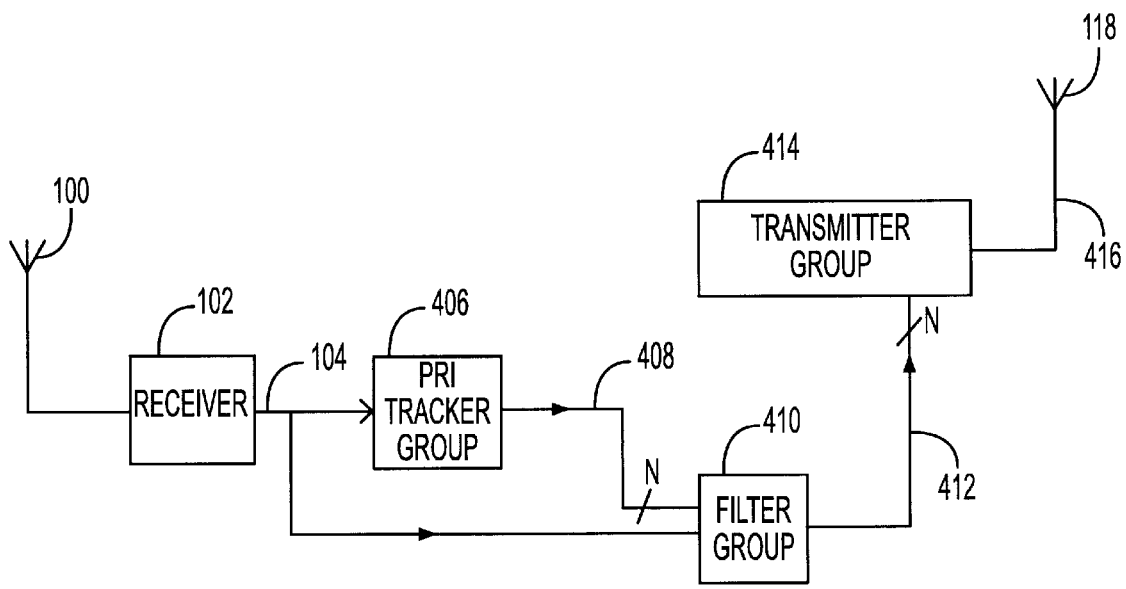
FIG. 4 depicts a second exemplary embodiment of a transponder in accordance with the present invention.
Figure 5:
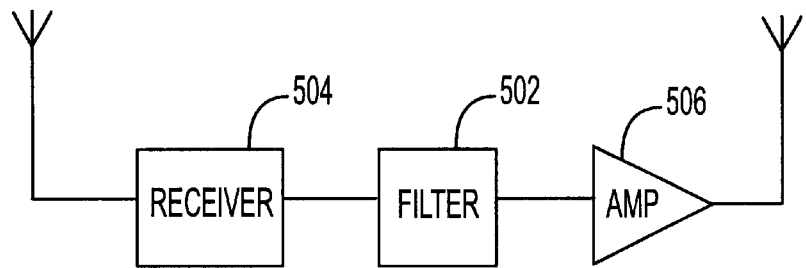
FIG. 5 depicts a prior art repeater system.
Figure 6:
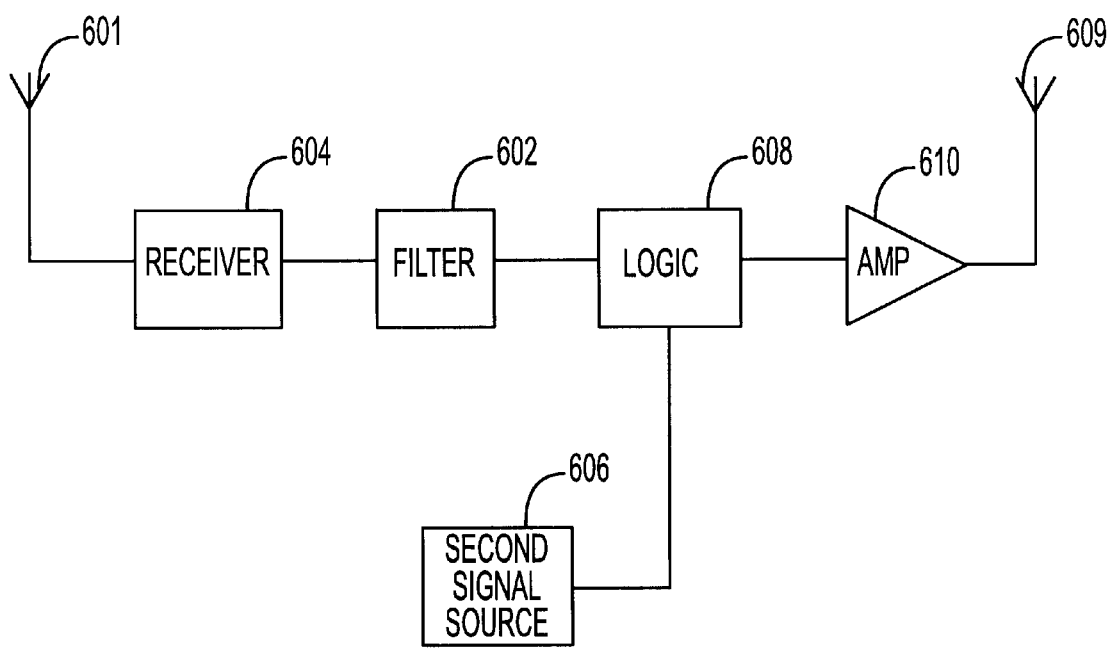
FIG. 6 depicts a prior art transponder system.

Referring to FIG. 4, in operation, a pulsed RF signal is input into receiver 102 by means of the receiving antenna 100. Receiver 102 then sends the received pulsed RF signal to both the PRI tracker 106 and the logic AND gate 202. Since the PRI tracker 106 is programmed to produce a gating pulse having a PRI corresponding to the expected incoming signal, it is utilized as a gating signal which functions to "lock" onto the gate of the incoming signal. As stated, the output of the PRI tracker 106 is coupled to an input of the logic AND gate 202, which operates as a filter to eliminate extraneous noise and jitter and produce an enable signal 112, only when the output 108 of the PRI tracker 106, and the output 104 of the receiver 102 are active (i.e., logic high). The tunable pulsed RF source 302 provides a pulsed RF carrier signal that is amplified by amplifier 304. However, amplifier 304 only outputs an amplified signal 116 when enabled by the enable signal 112.

As such, in the given embodiment, the signal 116 is an amplified version of the carrier signal from the pulsed RF source 302. This signal, which represents the return signal, is then transmitted by antenna 118. More importantly, however, because the enable signal 112 is utilized to trigger the transmitter 114, for the reasons stated above, the delay between the receipt of the incoming pulse and the generation of the return pulse is substantially constant (i.e., minimal variation) on a pulse-by-pulse basis.

Accordingly, the present invention enables the transponder to efficiently filter a received signal and generate a return signal substantially free from jitter without using a predesigned, frequency specific filter. Thus, the present invention provides a tunable transponder that efficiently re-transmits a received signal without interference or clock jitter associated with prior art systems.

In certain applications, a plurality of different pulsed RF signals may need to be detected, amplified (in some instances even altered), and retransmitted. Since PRI trackers are used in regions which may be simultaneously subjected to a number of signals, a number of PRI trackers may be used. Separate PRI trackers with separate track loops may be used to detect the separate signals. The embodiment of the present invention as illustrated in FIG. 4 enables such an operation.

As illustrated in FIG. 4, a plurality of pulsed RF signals received by receiving antenna 100, are sent to receiver 102. Although receiver 102 may be a dedicated receiver, designed to receive a specific frequency or specifically modulated signal, in accordance with the present invention, receiver 102 may be a tunable receiver, designed to controllably receive a plurality of frequencies or types of modulated signals. The received signals that are output from receiver 102 are sent to both a PRI tracker group 406 and a filter group 410. The PRI tracker group 406 is a plurality of PRI trackers, each as described above in the previous exemplary embodiment. The number of lines N in the data bus should equal the number of PRI trackers in the PRI tracker group 406.

The output signals 408 of the PRI tracker group 406, are additionally sent to the filter group 410. Filter group 410 utilizes the output signals 408 of the PRI tracker group 406 to filter the received signals 404 in the same manner as described above in conjunction with the first exemplary embodiment.

The enable signal 412 enables the transmitter group 414 to transmit signals 116 from transmitting antenna 118. The transmitter group 414 may comprise a plurality of transmitters, each as described above in the previous exemplary embodiment, or one time-shared source and transmitter. Each transmitter within the transmitter group 414 may have an independent tunable RF source. In this case, each respective received and filtered pulsed RF signal may be retransmitted with a different pulsed RF carrier signal. Further, each retransmitted signal may be different from the originating received signal. Alternatively, each transmitter within the transmitter group 414 may use the same tunable RF source. In this case, all the received, and filtered pulsed RF signals may be retransmitted with the same pulsed RF carrier signal. Further, each retransmitted signal may be different from the originating received signal.

In operation, a plurality of pulsed RF signals are input into receiver 102 by means of the receiving antenna 100. Receiver 102 then sends the plurality of pulsed RF signals to the PRI tracker group 406 and a filter group 410. A plurality of tunable pulsed RF sources (not shown) provide respective pulsed RF carrier signals that are amplified by respective amplifiers (not shown). However, each respective amplifier only outputs an amplified signal 116 when enabled by the respective enable signal 412.

As such, the signal 416 is plurality of amplified versions of respective carrier signals from respective pulsed RF sources, with each information signal matching that of the respective enable signals 412. Since the enable signals 412 are the output of respective logic AND gates, the enable signals 412, each match that of its respective detected RF pulse signal 404. Consequently, the signal 416 is a plurality of amplified versions of respective carrier signals from the pulsed RF sources, with each information signal matching that of a respective detected pulsed RF signal 404.

The pulsed RF source 302 may provide a carrier signal different than that of the detected carrier RF signal 104.

Although certain specific embodiments of the present invention have been disclosed, it is noted that the present invention may be embodied in other forms without departing from the spirit or essential characteristics thereof. The present embodiments are therefor to be considered in all respects as illustrative and not restrictive, the scope of the invention being indicated by the appended claims, and all changes that come within the meaning and range of equivalency of the claims are therefore intended to be embraced therein.

What is claimed is:

1. A method of transponding pulsed RF signals comprising the steps of:
   receiving pulsed RF signals having a plurality of PRIs;
   generating, with a PRI tracker, control signals from said received pulsed RF signals;
   filtering said received pulsed RF signals with said control signals to thereby obtain enable signals; and
   controlling a transmitter with said enable signals to generate a corresponding return pulse for each pulsed RF signal and transmit the corresponding return pulse signal,
   wherein the corresponding return pulse signal is generated based on a component of the received pulsed RF signal.

2. The method of transponding pulsed RF signals of claim 1, wherein said step of controlling a transmitter further includes the step of:
   enabling an amplifier, said amplifier receiving an input signal from an input signal generator, and said amplifier outputting the corresponding return pulse.

3. The method of transponding pulsed RF signals of claim 2, wherein said amplifier is an RF amplifier and said input signal generator is a tunable RF source.

4. The method of transponding pulsed RF signals of claim 3, wherein said RF amplifier is a traveling wave tube amplifier and said tunable RF source is a synthesizer.

5. The method of transponding pulsed RF signals of claim 1, wherein said step of filtering said received pulsed RF signals with said control signals to thereby obtain enable signals further includes:
   inputting said received pulsed RF signals from said receiver into one input of a logic AND gate; and
   inputting said control signals from said PRI tracker into the other input of a logic AND gate.

6. A method of transponding pulsed RF signals comprising the steps of:
   receiving a plurality of pulsed RF signals, each pulsed RF signal having a plurality of PRIs;
   selecting one pulsed RF signal out of said plurality of pulsed RF signals;
   generating, with a PRI tracker, a control signal from said selected pulsed RF signal;
   filtering said selected pulsed RF signal with said control signal to thereby obtain an enable signal; and
   controlling a transmitter with said enable signal to generate a corresponding return pulse for each pulsed RF signal and transmit the corresponding return pulse signal,
   wherein the leading edge of each return pulse is generated after substantially the same time delay after receipt of the leading edge of the corresponding received pulsed RF signal.

7. The method of transponding pulsed RF signals of claim 6, wherein said step of controlling a transmitter further includes the step of:
   enabling an amplifier, said amplifier receiving an input signal from an input signal generator, and said amplifier outputting the corresponding return pulse.

8. The method of transponding pulsed RF signals of claim 7, wherein said amplifier is an RF amplifier and said input signal generator is a tunable RF source.

9. The method of transponding pulsed RF signals of claim 8, wherein said RF amplifier is a traveling wave tube amplifier and said tunable RF source is a synthesizer.

10. The method of transponding pulsed RF signals of claim 6, wherein said step of filtering said received pulsed RF signal with said control signal to thereby obtain an enable signal further includes:
    inputting said selected pulsed RF signal into one input of a logic AND gate; and
    inputting said control signal from said PRI tracker into the other input of a logic AND gate.

11. A pulsed RF signal transponder comprising:
    a receiver for receiving pulsed RF signals having a plurality of PRIs;
    a PRI tracker for generating control signals from said received pulsed RF signals;
    an enable signal generator for receiving said received pulsed RF signals and said control signals as input, and for generating enable signals as output; and
    a transmitter for transmitting, the transmitter being controlled with said enable signals to generate a corresponding return pulse for each pulsed RF signal,
    wherein the leading edge of each return pulse is generated after substantially the same time delay after receipt of the leading edge of the corresponding received pulsed RF signal.

12. The pulsed RF signal transponder of claim 11, said transmitter further includes:

an amplifier; and an input signal generator, wherein said amplifier, after receiving an input signal from said input signal generator, outputs the corresponding return pulse.

13. The pulsed RF signal transponder of claim 12, wherein said amplifier is an RF amplifier and said input signal generator is a tunable RF source.

14. The pulsed RF signal transponder of claim 13, wherein said RF amplifier is a traveling wave tube amplifier and said tunable RF source is a synthesizer.

15. The pulsed RF signal transponder of claim 11, wherein said enable signal generator further includes a logic AND gate.

16. A pulsed RF signal transponder comprising:

a receiver for receiving a plurality of pulsed RF signals, each pulsed RF signal having a plurality of PRIs;

a PRI tracker for selecting one pulsed RF signal out of said plurality of pulsed RF signals and for generating a control signal from said selected pulsed RF signal;

a filter for filtering said selected pulsed RF signal with said control signal to thereby obtain an enable signal; and a transmitter which receives the enable signal and generates a corresponding return pulse for each pulsed RF signal, and transmits the return pulse, wherein the leading edge of each return pulse is generated after substantially the same time delay after receipt of the leading edge of the corresponding received pulsed RF signal.

17. The pulsed RF signal transponder of claim 16, wherein said transmitter further comprises:

an amplifier, said amplifier receiving an input signal from an input signal generator, and said amplifier outputting the corresponding return pulse.

18. The pulsed RF signal transponder of claim 17, wherein said amplifier is an RF amplifier and said input signal generator is a tunable RF source.

19. The pulsed RF signal transponder of claim 18, wherein said RF amplifier is a traveling wave tube amplifier and said tunable RF source is a synthesizer.

20. The pulsed RF signal transponder of claim 16, wherein said filter further includes a logic AND gate.

21. A method of transponding signals comprising the steps of:

receiving a signal having an associated pulse-repetition interval, coupling said received signal to a pulse-repetition-interval tracker, said pulse repetition-interval tracker generating an output signal having a pulse-repetition interval corresponding to the pulse-repetition-interval of said received signal, and coupling said received signal and said output signal of said pulse-repetition interval tracker to a filter, said filter operative for producing an output signal when the received signal is present and said output signal of said pulse-repetition-interval tracker is active, wherein said output signal of said filter is utilized to trigger a transmitter, said transmitter generating a return pulse, said received signal is a pulsed signal, and said transmitter generates a corresponding return pulse for each pulse of said received signal, and the leading edge of each return pulse is generated after substantially the same time delay after receipt of the leading edge of the corresponding received pulse.

22. The method of claim 21, wherein said output of said filter is a logic low level when said output of said pulse-repetition interval tracker is inactive, said transmitter being disabled when said out of said filter is a logic low level.

23. The method of claim 21, wherein said received signal is converted to a digital signal prior to being coupled to said filter.

24. The method of claim 21, wherein said output signal of said pulse-repetition-interval tracker is a digital signal.

25. The method of claim 21, wherein said filter comprises an AND gate.

26. A transponder apparatus comprising:

a receiver for receiving a signal having an associated pulse-repetition interval, a pulse-repetition-interval tracker coupled to said receiver, aid pulse repetition-interval tracker generating an output signal having a pulse-repetition interval corresponding to the pulse-repetition-interval of said received signal, a filter coupled to said receiver and said pulse-repetition-interval tracker, said filter operative for producing an output signal when the received signal is present and said output signal of said pulse-repetition-interval tracker is active, and a transmitter for generating a return pulse, said output signal of said filter being utilized to trigger said transmitter to generate said return pulse, and for transmitting the return pulse, wherein said received signal is a pulsed signal, and said transmitter generates a corresponding return pulse for each pulse of said received signal, and the leading edge of each return pulse is generated after substantially the same time delay after receipt of the leading edge of the corresponding received pulse.

27. The transponder of claim 26, wherein said output of said filter is a logic low level when said output of said pulse-repetition interval tracker is inactive, said transmitter being disabled when said out of said filter is a logic low level.

28. The transponder of claim 26, wherein said received signal is converted to a digital signal prior to being coupled to said filter.

29. The transponder of claim 26, wherein said output signal of said pulse-repetition-interval tracker is a digital signal.

30. The transponder of claim 26, wherein said filter comprises an AND gate.

* * * * *